US010252694B2

(12) United States Patent
Lin et al.

(10) Patent No.: US 10,252,694 B2
(45) Date of Patent: Apr. 9, 2019

(54) ADAPTIVE SEATBELT SYSTEM AND METHOD

(71) Applicant: GM GLOBAL TECHNOLOGY OPERATIONS LLC, Detroit, MI (US)

(72) Inventors: Chin-Hsu Lin, Troy, MI (US); Jenne-Tai Wang, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 15/626,568

(22) Filed: Jun. 19, 2017

(65) Prior Publication Data

US 2018/0361984 A1    Dec. 20, 2018

(51) Int. Cl.
*B60N 2/00*  (2006.01)
*G06K 9/00*  (2006.01)
*B60R 22/20*  (2006.01)

(52) U.S. Cl.
CPC .............. *B60R 22/20* (2013.01); *B60N 2/002* (2013.01); *G06K 9/00382* (2013.01); *B60R 2022/208* (2013.01)

(58) Field of Classification Search
CPC ... B60R 22/20; B60R 2022/208; B60N 2/002; G06K 9/00382
See application file for complete search history.

(56) References Cited

U.S. PATENT DOCUMENTS

| 5,201,385 | A | 4/1993 | Browne et al. |
| 5,265,908 | A | 11/1993 | Verellen et al. |
| 8,437,919 | B2 | 5/2013 | Wang et al. |
| 9,421,944 | B2 | 8/2016 | Cuddihy et al. |
| 10,065,597 | B2 * | 9/2018 | Gast ...................... B60R 22/105 |
| 2015/0097410 | A1 * | 4/2015 | Carbone ................ B60N 2/688 297/486 |
| 2015/0367813 | A1 * | 12/2015 | Ballarin ................... B60N 2/50 280/805 |
| 2016/0052477 | A1 * | 2/2016 | Tobata .................. B60R 21/207 280/730.1 |
| 2017/0361746 | A1 * | 12/2017 | Zouzal ................... B60K 26/02 |
| 2018/0022246 | A1 * | 1/2018 | Patrick .................. B60N 2/002 297/284.3 |

FOREIGN PATENT DOCUMENTS

| GB | 2323017 A | 9/1998 |
| JP | 2004345443 A | * 12/2004 |

* cited by examiner

*Primary Examiner* — Drew J Brown
(74) *Attorney, Agent, or Firm* — Lorenz & Kopf, LLP

(57) ABSTRACT

Adaptive seatbelt systems and methods are provided for adjusting the position of a seatbelt relative to an occupant. An adaptive seatbelt system for a vehicle includes a seat. A belt is configured to restrain an occupant in the seat. An anchor point along the belt is provided at an elevated position. An actuator raises or lowers the anchor point relative to the seat. A controller receives an input signal containing occupant identifying information and biometric data corresponding to occupant identification data. A processor compares the occupant identifying information to occupant identification data to verify an occupant's identity. The processor may determine an optimal comfort height or an optimal restraint height for the third anchor point based on the biometric data. The actuator adjusts the anchor point to the optimal comfort height or to the optimal restraint height in response to signals from the processor.

20 Claims, 9 Drawing Sheets

ADAPTIVE SEATBELT SYSTEM AND METHOD

INTRODUCTION

The present invention generally relates to seatbelt systems and methods, and more particularly relates to adaptive seatbelt systems and methods for self-adjusting the position of a seatbelt relative to an occupant based on the occupant size and seating posture, seat setting, and/or predicted impact risk.

Passenger vehicles are provided with seatbelts to restrain occupant movement. A typical seatbelt system includes a belt usually made from a material with woven fibers constructed as a flat strip called webbing. The belt is generally attached to the vehicle at three points providing a three-point restraint system. Additional attachment points may also be used in some applications. One of the attachment points is usually made through a retractor that is fixed to the vehicle on one side of the seat and that includes a ratchet mechanism that takes up slack in the belt. The second attachment point is made through a releasable connection positioned on an opposite side of the seat from the retractor. The releasable connection is typically accomplished through a mating buckle fixed to the vehicle and latch plate carried on the belt. When the buckle and latch plate are connected, the belt is routed over the occupant's lap area. The third attachment point is typically provided on the same side of the seat as the retractor, but at an elevated position relative to the retractor so that the belt is routed over the occupant's shoulder. Positioning of the seat belt contributes to competing performance requirements, the comfort level of the occupant and effectiveness of the seatbelt system.

Accordingly, it is desirable to provide improved systems and techniques for positioning a seatbelt relative to an occupant. It is also desirable to provide methods, systems, and vehicles utilizing such techniques. Furthermore, other desirable features and characteristics of seatbelts will be apparent from the subsequent detailed description and the appended claims, taken in conjunction with the accompanying drawings and the foregoing technical field and introduction.

SUMMARY

Adaptive seatbelt systems and methods are provided for positioning a seatbelt relative to an occupant. In a number of examples, an adaptive seatbelt system for a vehicle includes a seat with a seat bottom and a seat back. A belt is configured to restrain an occupant in the seat. An anchor point along the belt is provided at an elevated position. An actuator raises and lowers the anchor point relative to an occupant in the seat. A controller receives an input signal containing occupant identifying information and biometric data corresponding to stored occupant identification data, and a processor compares the occupant identifying information to occupant identification data to verify an occupant's identity. The processor determines an optimal comfort height for the anchor point based on the biometric data. The actuator adjusts the anchor point to the optimal comfort height in response to signals from the processor.

In another example of an adaptive seatbelt system, the processor may be configured to determine an optimal restraint height for the anchor point based on the biometric data of the occupant. The optimal restraint height is different than the optimal comfort height.

In another example of an adaptive seatbelt system, a height sensor may generate height data indicative of a height of the seat bottom, and an angle sensor may generate angle data indicative of an angle of the seat back. The processor determines the optimal comfort height for the anchor point based on the biometric data, the height data, and the angle data.

In another example of an adaptive seatbelt system, the processor may determine the optimal restraint height for the anchor point based on the biometric data, the height data and the angle data.

In another example of an adaptive seatbelt system, a retractor may be configured to take up slack in the belt. The processor may be configured to receive impact risk data and to determine whether an impact risk exceeds a threshold based on the impact risk data. The retractor may lock when the impact risk exceeds the threshold.

In another example of an adaptive seatbelt system, when impact risk exceeds the threshold, the actuator may adjust the anchor point from the optimal comfort height to the optimal restraint height.

In another example of an adaptive seatbelt system, an exterior sensor may generate exterior data indicative of a potential impact. When the impact risk exceeds the threshold, the processor may provide a lock signal to lock the retractor.

In another example of an adaptive seatbelt system, an interior sensor may generate a signal representative of the occupant identifying information.

In other examples, a method of controlling an adaptive seatbelt system for a vehicle includes obtaining occupant identification data and biometric data corresponding to the occupant identification data. A processor receives occupant identifying information and compares it to the occupant identification data to verify an occupant's identity. The processor determines an optimal comfort height for the anchor point based on the biometric data. The anchor point is adjusted to the optimal comfort height in response to signals from the processor to the actuator.

In another example for a method of controlling an adaptive seatbelt system, the occupant identification data may contain information that is unique and personally identifiable and may be stored in the data storage device.

In another example for a method of controlling an adaptive seatbelt system, an optimal restraint height for the anchor point may be determined based on the biometric data. The optimal restraint height may be higher than the optimal comfort height.

In another example for a method of controlling an adaptive seatbelt system, height data indicative of a height of the seat bottom may be received from a height sensor and angle data indicative of an angle of the seat back may be received from an angle sensor. The optimal comfort height for the anchor point may be determined based on the biometric data, the height data, and the angle data.

In another example for a method of controlling an adaptive seatbelt system, the optimal restraint height for the anchor point may be determined based on the biometric data, the height data and the angle data.

In another example for a method of controlling an adaptive seatbelt system, impact risk data indicative of an impact risk for the vehicle may be received by the processor. The processor may determine whether the impact risk exceeds a threshold based on the impact risk data. When the impact risk exceeds the threshold, a retractor may be locked.

In another example for a method of controlling an adaptive seatbelt system, when the impact risk exceeds the threshold, the actuator adjusts the anchor point from the optimal comfort height to the optimal restraint height in response to a signal from the processor.

In another example for a method of controlling an adaptive seatbelt system, an exterior sensor may generate the impact risk data as exterior data on an exterior environment of the vehicle. When an impact risk based on the exterior data exceeds the threshold, the processor may generate a signal to lock the retractor.

In another example for a method of controlling an adaptive seatbelt system, an interior sensor may generate a signal representative of the occupant identifying information.

In another example for a method of controlling an adaptive seatbelt system, a D-ring may be provided at the anchor point so that the belt slides through the D-ring.

In another example for a method of controlling an adaptive seatbelt system, the optimal restraint height for the anchor point based may be determined by the processor based on the biometric data. When the impact risk exceeds the threshold, the retractor may be locked and the anchor point may then be adjusted from the optimal comfort height to the optimal restraint height.

In additional examples, an adaptive seatbelt system for a vehicle includes a seat with a seat bottom with a height that is adjustable, and a seat back that reclines at a variable angle relative to the seat bottom. A belt is configured to restrain an occupant in the seat. Two anchor points are provided along the belt securing the belt to the vehicle. A third anchor point is provided along the belt securing the belt to the vehicle at an elevated position relative to the other two anchor points. An actuator is configured to raise and lower the third anchor point relative to the occupant. A height sensor is configured to generate height data indicative of the height of the seat bottom. An angle sensor is configured to generate angle data indicative of the angle of the seat back. A controller has a processor and a data storage device that stores occupant identification data and biometric data corresponding to the occupant identification data. The controller receives an input signal containing occupant identifying information. The processor receives the occupant identifying information and compares it to occupant identification data to verify an occupant's identity. The processor receives the biometric data, the height data and the angle data and determines an optimal comfort height for the third anchor point based on the biometric data, the height data and the angle data. The processor determines an optimal restraint height for the third anchor point based on the biometric data, the height data and the angle data, where the optimal restraint height is higher than the optimal comfort height. The actuator alternately adjusts the third anchor point to the optimal restraint height or to the optimal comfort height in response to signals from the processor.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to impart limitations. Furthermore, there is no intention to be bound by any theory presented in the preceding sections, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
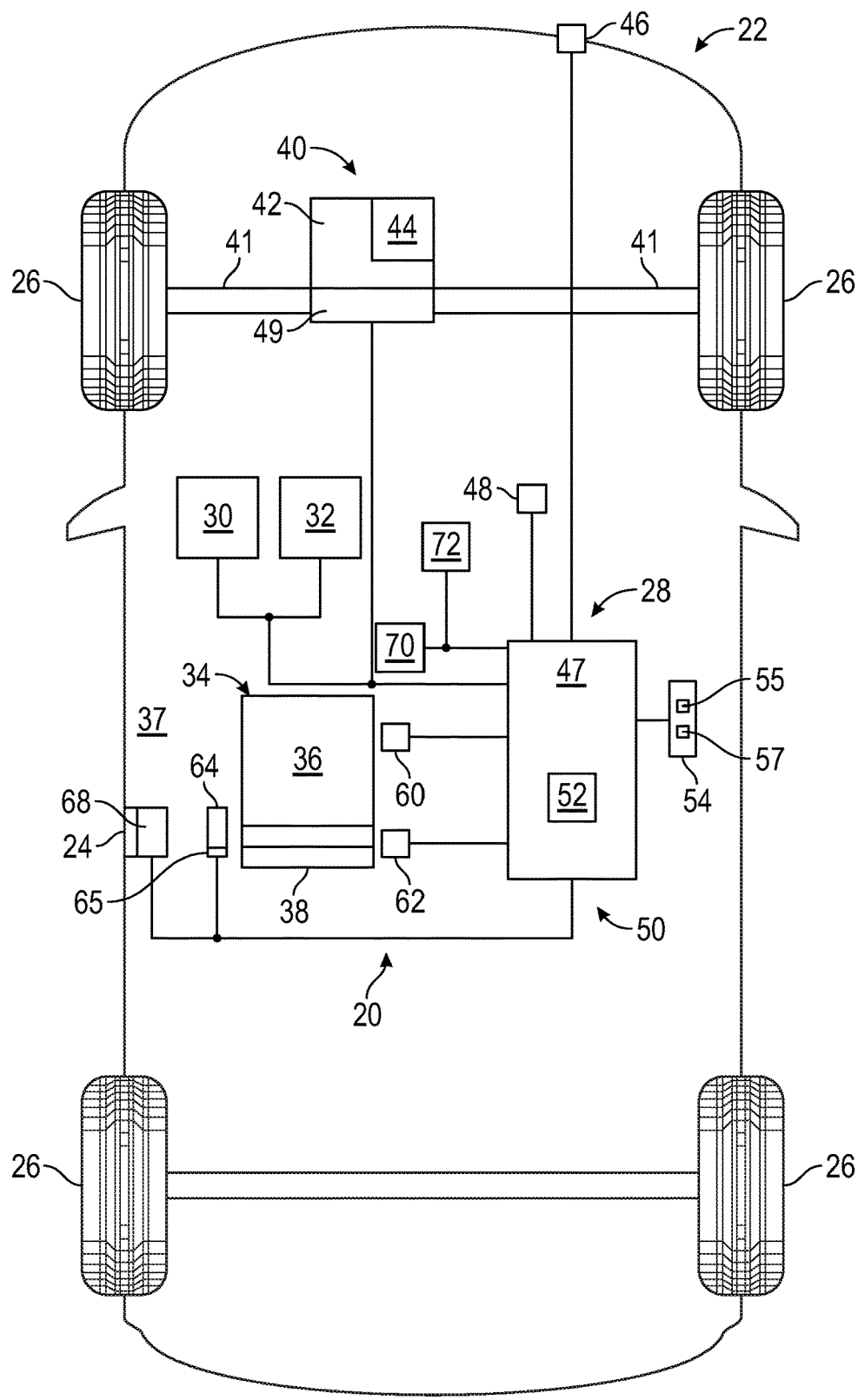
FIG. 1 is a functional block diagram of a vehicle that includes an adaptive seatbelt system, in accordance with an exemplary embodiment.

In a number of examples, an adaptive seatbelt system 20 may be employed in a vehicle 22, such as indicated in FIG. 1. The vehicle 22 may be any one of a number of different types of land, sea, or air vehicles, and in certain embodiments, may for example, be a passenger automobile of any configuration. As depicted in FIG. 1, the vehicle 22 may include, in addition to the above-referenced adaptive seatbelt system 20, any, or any combination of: a body 24, wheels 26, an electronic control system 28, a steering system 30, and a braking system 32. The wheels 26 may each be rotationally coupled to the body 24. The body 24 carries a number of seating positions for occupants such as seat 34. The seat 34 includes a seat bottom 36 mounted to the floor 37 of the vehicle 22 and a seat back 38 mounted to the seat bottom 36 or directly to the body 24. In various embodiments the vehicle 22 may differ from that depicted in FIG. 1. For example, in certain embodiments the number of wheels 26 may vary. By way of additional examples, in various embodiments the vehicle 22 may not have wheels 26 that react against a roadway, but may include another method of converting torque into motion, for example, through pitched blades operating against a fluid.

In the examples illustrated in FIG. 1, the vehicle 22 may include at least one propulsion system 40, which in these examples may drive the wheels 26. The propulsion system 40 may include an engine 42 which may be an internal combustion engine and/or an electric machine. The propulsion system 40 may be coupled to at least some of the wheels 26 through one or more drive shafts 41. In some examples, the propulsion system 40 may include the engine 42 and/or a transmission 44 to provide variable output. In a number of examples, the engine 42 and/or transmission 44 may not be necessary, and may be omitted.

In the examples illustrated in FIG. 1, the steering system 30 may control the direction of at least some of the wheels 26. In certain embodiments, the vehicle 22 may be autonomous, utilizing steering commands that are generated by a processor, such as in the electronic control system 28. The braking system 32 may provide braking for the vehicle 22. The braking system 32 may receive inputs from a driver via a brake pedal (not shown), which may control vehicle deceleration through wheel brakes (not shown). A driver may also provide inputs via an accelerator pedal (not shown) to command a desired speed or acceleration of the vehicle 22. Response of the vehicle 22 to these inputs may be effected, at least in part, through an output speed and/or torque of the propulsion system 40. Similar to the description above regarding possible variations for the vehicle 22, in certain embodiments steering, braking, and/or acceleration may be commanded by a computer instead of by a driver, such as through an autonomous capability.

The electronic control system 28 may include variations of systems, components and/or modules that may be packaged together, or distributed to various locations of the vehicle 22. In a number of examples, the electronic control system 28 may include an engine control module, a body control module, a transmission control module, a vehicle integration control module, and/or one or more other components to control a system, function or operation, of the vehicle 22. The adaptive seatbelt system 20 includes a control system 50, which may be included in the vehicle's electronic control system 28.

The vehicle 22 includes an exterior sensor suite 46 that includes one or more sensing devices that sense observable conditions of the exterior environment of the vehicle 22 and that generate exterior data. The sensing devices in the sensor suite 46 may include radars, lidars, global positioning systems, optical cameras, thermal cameras, ultrasonic sensors, and/or other sensors to monitor and provide data on various exterior parameters used by the vehicle 22. The vehicle 22 also includes an interior sensor suite 48 that includes one or more sensing devices that sense observable conditions of the interior environment of the vehicle 22. The sensing devices in the sensor suite 48 may include pressure sensors, position sensors, optical cameras, ultrasonic sensors, mass sensors, biometric sensors, weight sensors, and other types of sensors to monitor and provide data on various interior parameters, including those of occupants, and used by the vehicle 22.

The electronic control system 28 includes at least one controller 47 with at least one processor 52 and is associated with a computer readable data storage device 54. The control system 50 may use the processor 52 and the data storage device 54 and/or may include separate resources. The processor 52 may be any custom made or commercially available processor, a central processing unit (CPU), an auxiliary processor among several processors associated with the electronic control system 28 and the control system 50, a semiconductor based microprocessor (in the form of a microchip or chip set), a macroprocessor, any combination thereof, or generally any device for executing instructions. The data storage device or media 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the electronic control system 28 and/or the control system 50, in controlling the vehicle 22 and its systems.

The instructions may include one or more separate programs, each of which comprises an ordered listing of executable instructions for implementing logical functions. The instructions, when executed by the processor 52, receive and process signals from the sensor suites 46, 48 and from the adaptive seatbelt system 20, perform logic, calculations, methods and/or algorithms for automatically controlling the components of the vehicle 22. The processor 52 may generate control signals for the adaptive seatbelt system 20 and other systems of the vehicle 22 to effect automatic control based on the logic, calculations, methods, and/or algorithms. Embodiments of the vehicle 22 may include any number of electronic control units which communicate over any suitable communication medium or a combination of communication mediums and that cooperate to process the sensor signals, perform logic, calculations, methods, and/or algorithms, and generate control signals to automatically control features of the vehicle 22.

The data storage device 54 stores data for use in automatically controlling the vehicle 22. In various embodiments, the data storage device 54 stores various forms of data including occupant identification data 55 such as names, personal identification numbers, alphanumeric passwords and biometric data 57 or other personally identifiable information. For example, the biometric data 57 may include biometric identifiers such as facial features, fingerprints, retinal maps, voice data, etc, for use in identifying a specific individual. The biometric data may also include physical characteristics, for example, weight, height, length of torso, length of legs, sitting height, etc, for use in height adjustment in the adaptive seatbelt system 20. As can be appreciated, the data storage device 54 may be part of the controller 47, separate from the controller 47, or part of another controller, or of multiple controllers. The data storage device 54 stores the biometric data 57 corresponding to the occupant identification data 55 for an individual or individuals. The biometric data 57 may be part of the occupant identification data 57 or may reside separately. For example, the part of the biometric data 57 used for identifying a specific individual may be stored as part of the occupant identification data 55 and the part of the biometric data 57 used for height adjustment may be stored separately.

The body 24 of the vehicle 22 may carry a number of components of the adaptive seatbelt system 20. A seat height sensor 60 is disposed to monitor the height of the seat bottom 36, such as relative to the floor 37. For example, a resistive, hall effect or magneto-resistive linear position sensor may be connected between the floor 37 and the seat bottom 36, or a rotary position sensor may be similarly connected through a linkage. The seat height sensor 60 is electrically coupled with the controller 47. A seat angle sensor 62 is disposed to measure the angle of the seat back 38 such as relative to the seat bottom 36. For example, a hall effect or magneto-resistive sensor may be mounted to monitor the state of recline of the seat back 38. The seat angle sensor 62 is electrically coupled with the controller 47. A seatbelt retractor 64 takes up belt slack and is fixed relative to the body 24 and is positioned near the seat 34. The seatbelt retractor 64 is in electrical communication with the controller 47. The seatbelt retractor 64 includes an actuator 65, such as a solenoid, that locks the retractor to prevent movement of the belt out of the retractor. A seatbelt height adjuster 68 is mounted relative to the body 24 and is positioned near the seat 34 at an elevated location relative to the seatbelt retractor 64. The seatbelt height adjuster 68 is in electrical communication with the controller 47. A user interface 70 may provide information to, and/or obtain inputs from, an occupant of the vehicle 22 regarding user identification, settings, etc. In various embodiments, the user interface 70 may comprise one or more sensors associated with user interfaces such as vehicle touch screens, rotary knobs, buttons, and/or other types of user interfaces within the vehicle 22 for receiving inputs from an occupant. Alternately, in certain embodiments, some or all of the user inputs may be received instead via the transceiver 72 (e.g. via transmissions from the occupant's smartphone, key fob, and/or other electronic devices). The transceiver 72 transmits and/or receives various information for the adaptive seatbelt system 20. In various embodiments, the transceiver 72 transmits various signals, such as to request identification inputs from the occupant or from the occupant's electronic devices. In certain embodiments, the transceiver 72 also receives inputs from the occupant or from the occupant's electronic device, for example including the occupant's responses to notifications. In addition, the transceiver 72 may communicate with one or more vehicle components including with the controller 47.

Figure 2:
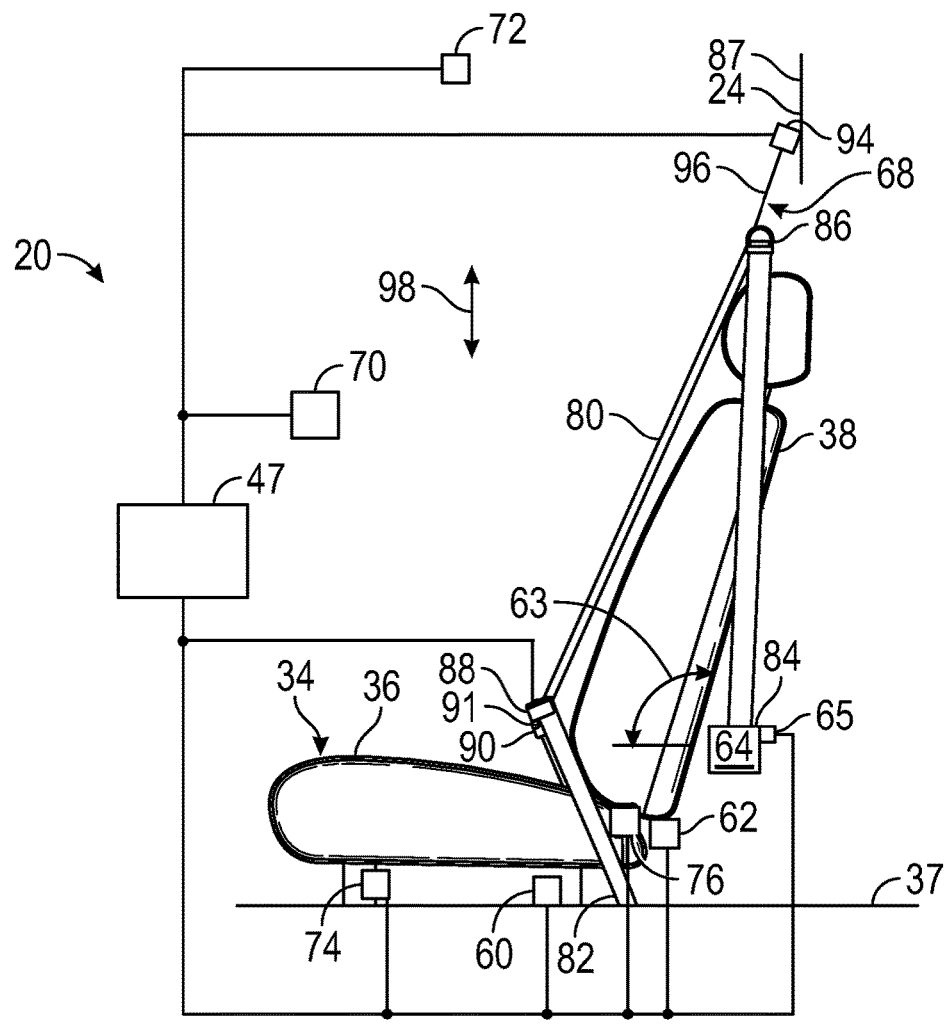
FIG. 2 is a schematic diagram of the adaptive seatbelt system of FIG. 1, in accordance with various embodiments.

Referring to FIG. 2, the seat 34 includes a seat height adjuster 74 to raise and lower the seat bottom 36 relative to the floor 37. The seat height sensor 60 monitors the height of the seat bottom 36 and provides a corresponding input signal to provide height data to the controller 47. The seat 34 includes a recline adjuster 76 to tilt the seat back 38 at variable angles relative to the seat bottom 36. The seat angle sensor 62 monitors the angle 63 of the seat back 38 and provides a corresponding input signal to provide angle data to the controller 47. The seat height and seat back angle may be adjusted automatically by the controller 47, such as to correspond to an identified occupant's personal settings, or manually, such as through inputs to the user interface 70.

The adaptive seatbelt system 20 includes a belt 80 with a first end 82 anchored to the body 24 on the same side of the seat 34 as the retractor 64, and a second end 84 taken up by the retractor 64. The belt 80 is routed through a D-ring 86 and a latch plate 88. A buckle 90 is positioned on an opposite side of the seat 34 from the retractor 64 and is anchored to the seat 34 or otherwise to the body 24. The latch plate 88 is connectable with the buckle 90 to secure the belt 80 across the seat 34 and a seated occupant. The retractor 64 and the anchored first end 82 provide one anchor point for the adaptive seatbelt system 20. The latch plate 88 and buckle 90 provide another anchor point. A third anchor point is provided by the D-ring 86/seatbelt height adjuster 68. A sensor 91, such as a switch registers connection between the latch plate 88 and the buckle 90 and communicates with the controller 47 via a signal. The belt 80 slides through the latch plate 88 and the D-ring 86. The D-ring 86 is connected with the body 24, such as at a pillar 87, through the seatbelt height adjuster 68. The seatbelt height adjuster 68 includes an actuator 94, such as an electric motor, connected with the D-ring 86 through a linkage 96, such as a screw drive. The actuator 94 is in electrical communication with the controller 47 for driving the D-ring 86 generally in the up-down direction 98.

Figure 3:
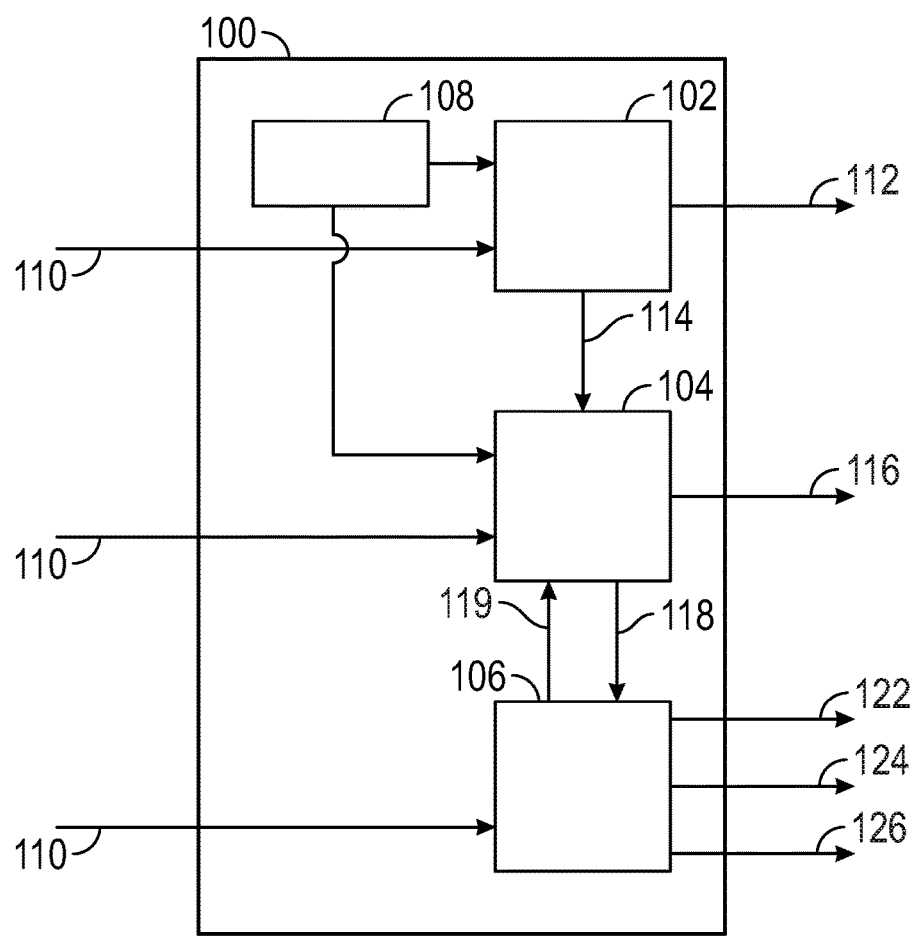
FIG. 3 is a dataflow diagram illustrating a control system of the adaptive seatbelt system of FIG. 1 in accordance with various embodiments.

In various embodiments, one or more instructions are embodied in the control system 50 and, when executed by the processor 52, effect operation of the adaptive seatbelt system 20. As illustrated in FIG. 3, a dataflow diagram illustrates various embodiments of a control module 100 that may be embedded within the controller 47 for operation of the control system 50. Various embodiments of the adaptive seatbelt system 20 according to the present disclosure may include any number of sub-modules embedded within the controller 47. As can be appreciated, the sub-modules shown in FIG. 3 can be combined and/or further partitioned to similarly adjust the position of a belt 80 relative to an occupant. Inputs 110 to the control module 100 may be delivered from other parts of the adaptive seatbelt system 20, from the sensor suites 46, 48, from other systems of the vehicle 22, received from other control modules (not shown), and/or determined/modeled by other sub-modules (not shown) within the controller 47. In various embodiments, the control module 100 includes an occupant detection module 102, a comfort control module 104, and a restraint control module 106, along with data storage 108. Each of the occupant detection module 102, the comfort control module 104, and the restraint control module 106 receive inputs 110, while the occupant detection module 102 and the comfort control module 104 receive data from the data storage 108. The data storage 108 stores data, such as in the data storage device 54, including the occupant identification data 55 including the biometric data 57. The occupant detection module 102 processes the inputs 110 and data, may deliver an output signal 112 to request occupant identification, and may provide a signal 114 to the comfort control module 104 for its initiation. The comfort control module 104 processes the inputs 110 and data, provides an output signal 116 supplied to the seatbelt height adjuster 68 to provide a comfort position, and may provide a signal 118 to the restraint module 106 for its initiation. The restraint control module 106 processes the inputs 110, and provides an output signal 120 to the seatbelt height adjuster 68 to provide a restrain position. Further details of the control module 100 are described below.

Figure 4:
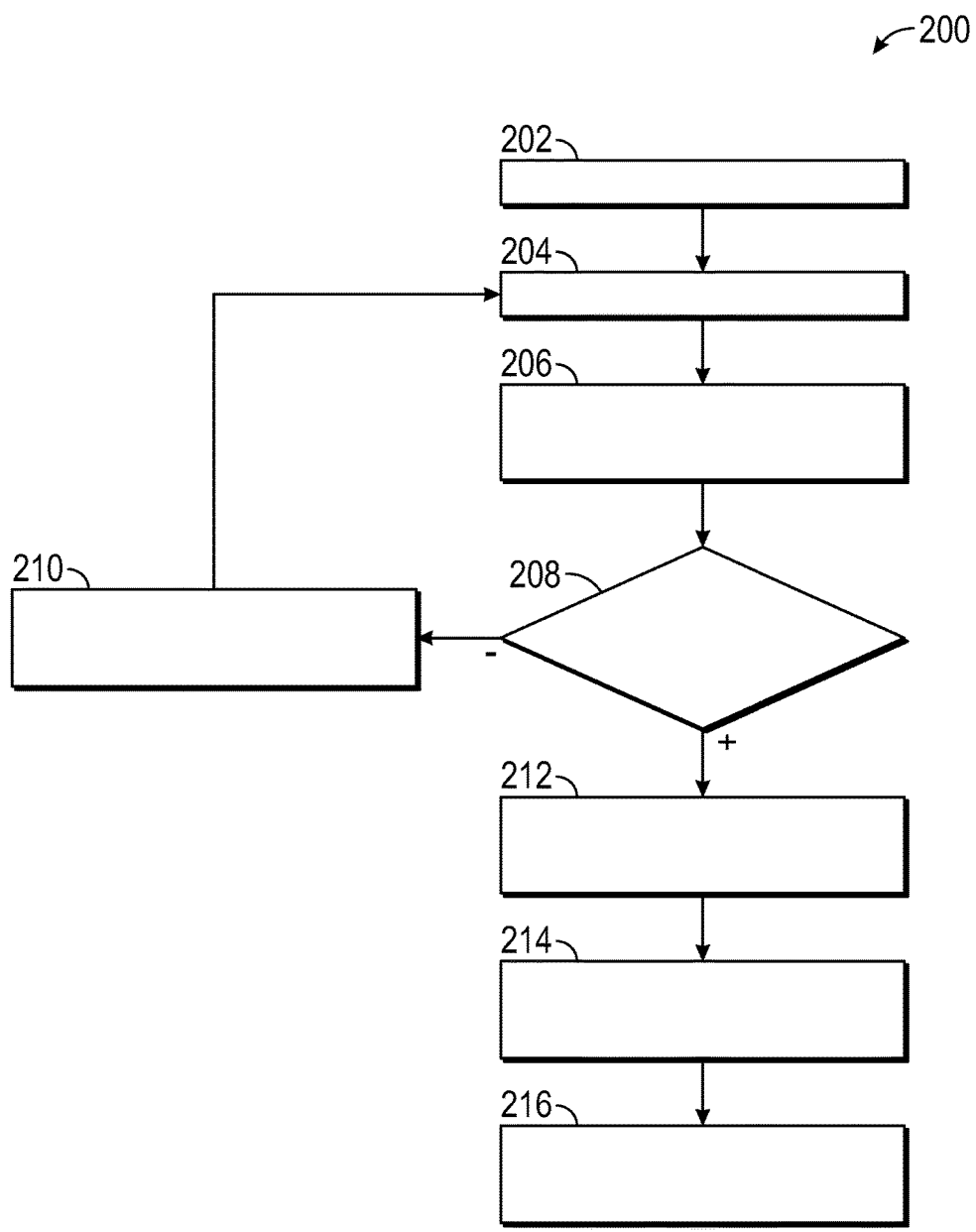
FIG. 4 is a flowchart of an adaptive seatbelt process in accordance with various embodiments.

With reference to FIG. 4, an embodiment of a process 200 for control of the adaptive seatbelt system 20 is illustrated in flowchart form. The process 200 is initiated at step 202 such as upon startup of the vehicle 22. The adaptive seatbelt system 20 initiates operation upon vehicle startup or upon engagement of the latch plate 88 with the buckle 90 as determined by the switch 91, whichever occurs later. The process 200 proceeds to step 202 and the occupant detection module 102 may provide the output signal 112 to request occupant identification. The output signal 112 may be delivered to the transceiver 72, the user interface 70, or the interior sensor suite 48. In the case of the transceiver 72, it responds by communicating with the occupant or their electronic device for identifying information. In the case of the user interface 70, a request for identifying information is displayed or otherwise communicated for receipt by the occupant. In the case of the sensor suite 48, the occupant is scanned for identification characteristics. The process 200 proceeds to step 204 to wait for occupant identification. The result is communicated to the occupant detection module 202 as occupant identifying information received through the inputs 110. The process 200 proceeds to step 208 where a determination is made as to whether the occupant is identified. The occupant identification module 102 accesses occupant identification data 55/biometric data 57 from the data storage 108 and compares it to the occupant identifying information in the inputs 110. When the outcome is negative and the occupant identifying information does not match stored occupant identification data 55/biometric data 57 for any known individual, the process 200 proceeds to step 210 and the adaptive seatbelt system 20 accepts manual seatbelt height adjuster inputs. For example, the occupant may provide inputs through the user interface 70 to drive the actuator 94 to raise or lower the D-ring 86 to position the belt 80 in a comfortable position. From step 210 the process 200 returns to step 204 and the occupant detection module 102 processes a monitoring loop that cycles through steps 204-210 until an occupant matching stored occupant identification data 55/biometric data 57 is identified at step 208.

When the determination at step 208 is positive where the occupant identifying information matches the occupant identification data 55/biometric data 57 in the data storage 108, the process 200 proceeds to step 212 and the occupant detection module 102 provides the signal 114 to the comfort module 104 to initiate a comfort adjustment routine. The comfort control module 104 accesses information from the data storage 108 on the specific individual identified at step 208. The biometric data 57 may include physical characteristics and the occupant identification data 55 may include personal preferences corresponding to the person described by the occupant identification data 55. The biometric data 57 may be obtained by direct measurement of persons, such as through the interior sensor suite 48, or may be communicated by the persons, such as through the user interface 70 and stored, such as in the data storage device 54. The physical characteristics may include, for example, weight, height, length of torso, length of legs, sitting height, etc. At step 212 the comfort control module 104 also uses input signals 110 which comprise signals from the seat height sensor 60 for seat height, and the seat angle sensor 62 on seatback angle.

Figure 5:
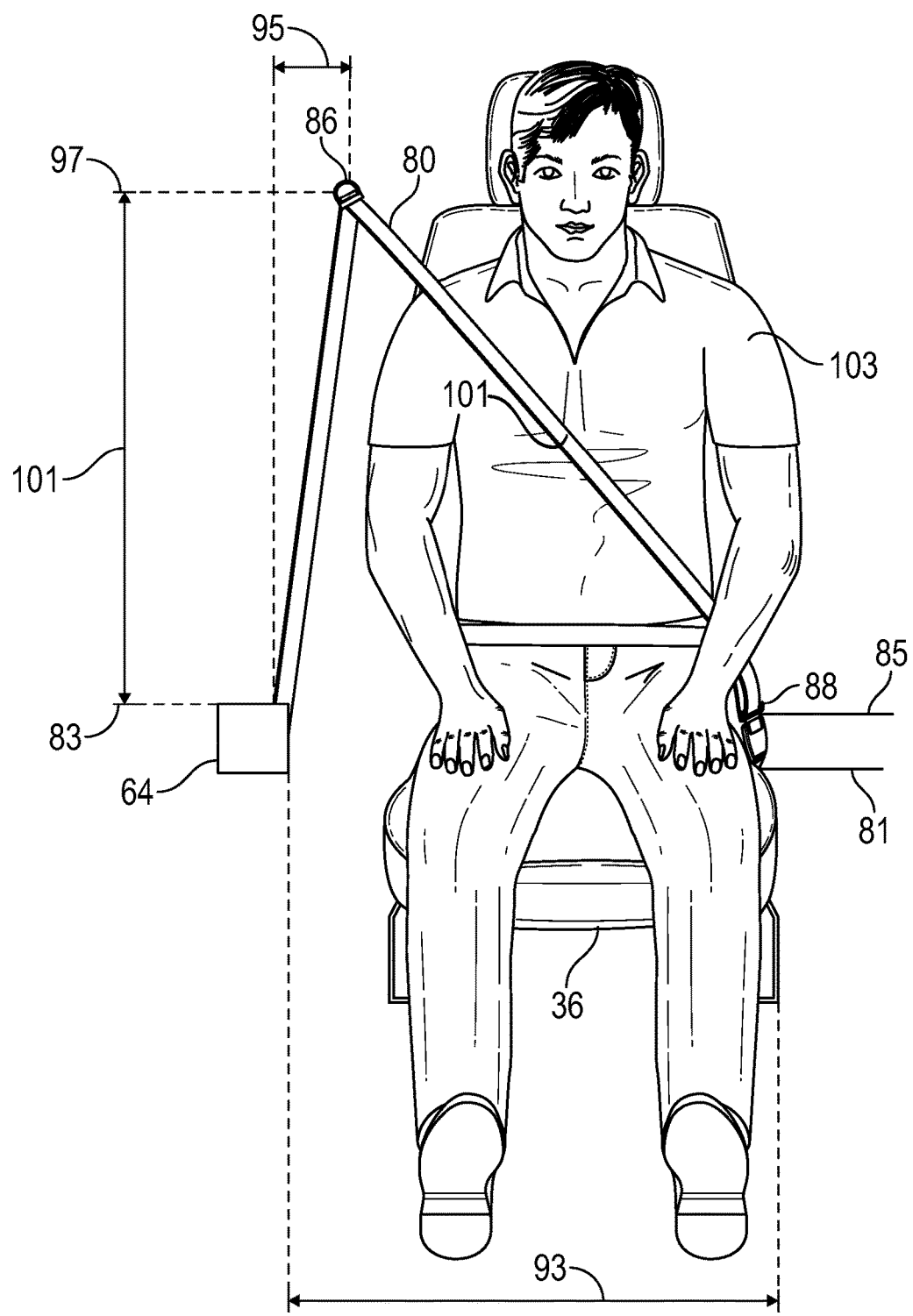
FIG. 5 is a simplified illustration of the adaptive seatbelt system of FIG. 1 with a seated occupant, in accordance with various embodiments.

Equipped with the information and data from step 212, the process 200 proceeds to step 214 where at least one optimal height is calculated. In this example, the optimal height of the D-ring 86 for comfort of the identified occupant is calculated. With reference to FIG. 5, an illustration of the adaptive seatbelt system 20 is shown with a seated occupant. The vertical heights 83, 85 of the retractor 64 and of the anchor plate 88 engaged in the buckle 90 respectively, are known from the physical dimensions of the vehicle 22. The horizontal distance 93 between the retractor 64 and the latch plate 88, and the horizontal distance 95 between the retractor 64 and the D-ring 86 are also similarly known. The height 81 of the seat bottom 36 is known from the seat height sensor 74 and the recline angle of the seat back 38 (shown in FIG. 2), is known from the seat angle sensor 62. Changes in seat bottom height and seat back recline will change the effective height of the occupant and so are taken into consideration in the calculation. The optimal comfort height 97 ($SH_1$), of the D-ring 86 is calculated using geometry so that the path of the belt 80 when extending between the D-ring 86 and the latch plate 88, crosses the occupant 103 at a comfortable height 101 (e.g. so that the belt 80 does not rub the occupant's neck). The process 200 proceeds to step 216 and the comfort control module 104 provides the output signal 116 to the actuator 94 to adjust the height of the D-ring 86 to the optimal comfort height 97/$SH_1$ achieving the comfortable height 101, and the process 200 ends at step 218.

Figure 6:
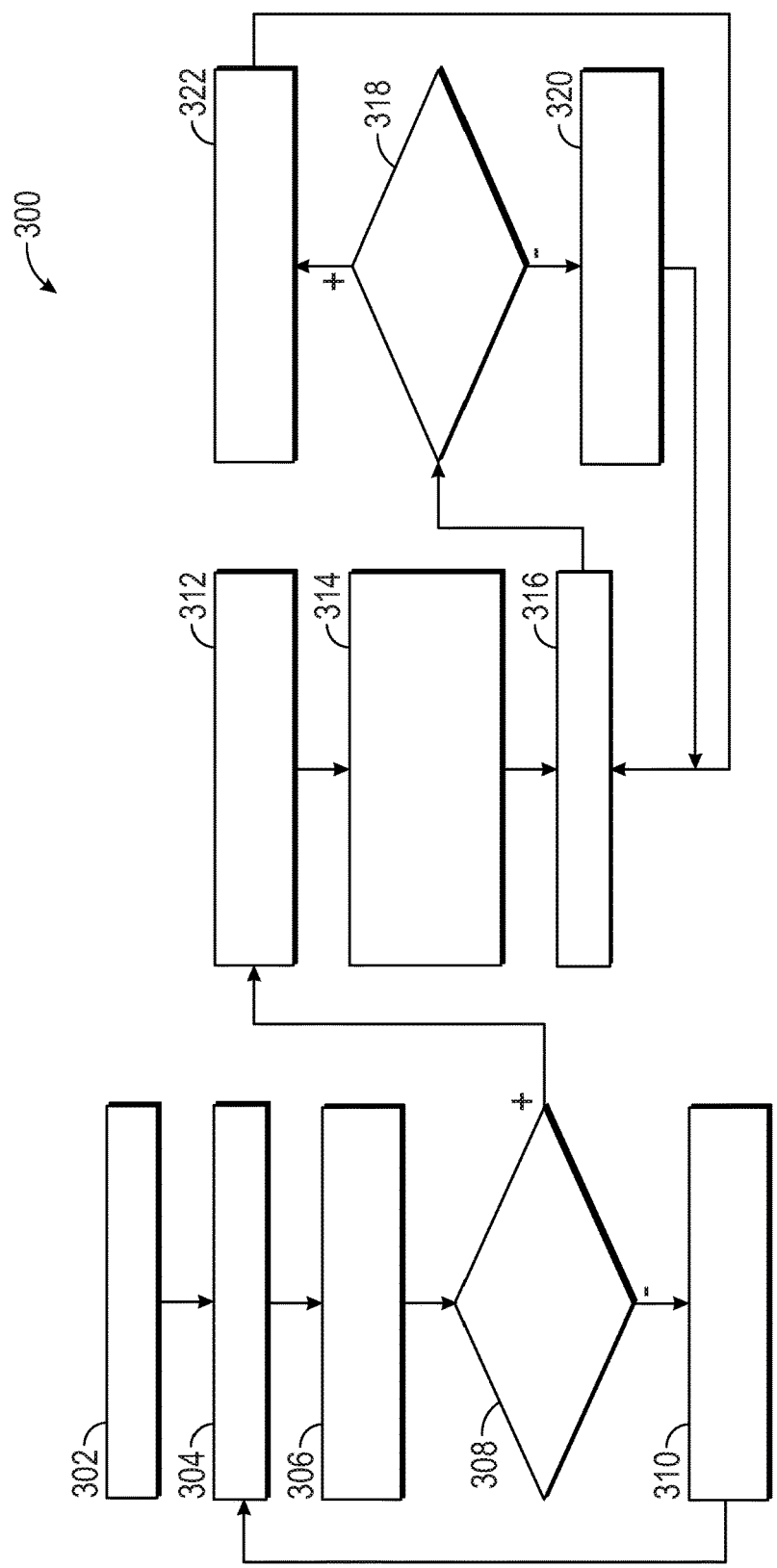
FIG. 6 is a flowchart of an adaptive seatbelt process in accordance with various embodiments.

With reference to FIG. 6, an embodiment of a process 300 for control of the adaptive seatbelt system 20 is illustrated in flowchart form. The process 300 is initiated at step 302 such as upon startup of the vehicle 22. The adaptive seatbelt system 20 initiates operation upon vehicle startup or upon engagement of the latch plate 88 with the buckle 90 as determined by the switch 91, whichever occurs later. The process 300 proceeds to step 302 and the occupant detection module 102 provides the signal 112 to request occupant identification. The signal 112 may be delivered to the transceiver 72, the user interface 70, or the interior sensor suite 48. In the case of the transceiver 72, it responds by communicating with the occupant or their electronic device for identifying information. In the case of the user interface 70, a request for identifying information is displayed or otherwise communicated for receipt by the occupant. In the case of the sensor suite 48, the occupant is scanned for identification characteristics. The process 300 proceeds to step 304 to wait for occupant identification. The result is communicated to the occupant detection module 302 as occupant identifying information received through the inputs 110. The process 300 proceeds to step 308 where a determination is made as to whether the occupant is identified. The occupant identification module 102 accesses occupant identification data 55 from the data storage 108 and compares it to the occupant identifying information received through the inputs 110. When the outcome is negative and the occupant identifying information does not match the stored occupant identification data 55, the process 300 proceeds to step 310 and the adaptive seatbelt system 20 accepts manual seatbelt height adjuster inputs. For example, the occupant may provide inputs through the user interface 70 to drive the actuator 94 to raise or lower the D-ring 86 to position the belt 80 in a comfortable position. From step 310 the process 300 returns to step 304 and the occupant detection module 102 processes a monitoring loop that cycles through steps 304-310 until an occupant is identified at step 308.

When the determination at step 308 is positive where the occupant identifying information matches an individual's occupant identification data 55 in the data storage 108, the process 300 proceeds to step 312 and the occupant detection module 102 provides the output signal 114 to the comfort module 104 to initiate a comfort adjustment routine. The comfort control module 104 accesses the biometric data 57 from the data storage 108 on the specific individual identified at step 308. The biometric data 57 may include physical characteristics (biometric data) and personal preferences. The biometric data 57 may be obtained by direct measurement of persons, such as through the interior sensor suite 48, or may be communicated by the persons, such as through the user interface 70 and stored, such as in the data storage device 54. The physical characteristics may include, for example, weight, height, length of torso, length of legs, sitting height, etc. At step 312 the comfort control module 104 also uses input signals 110 which comprise signals from the seat height sensor 60 for seat height, and the seat angle sensor 62 on seatback angle.

Figure 7:
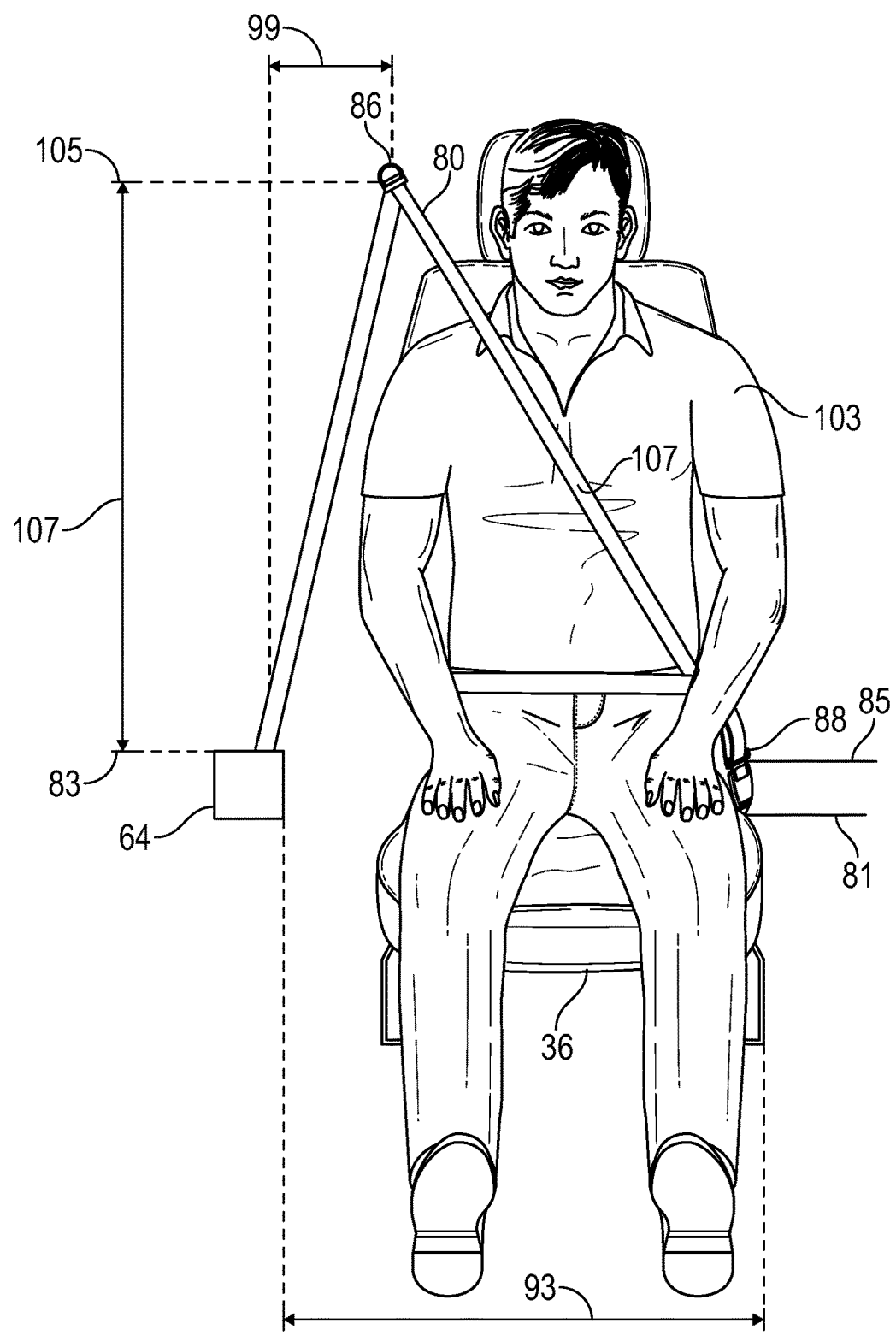
FIG. 7 is a simplified illustration of the adaptive seatbelt system of FIG. 1, with a seated occupant in accordance with various embodiments.

Equipped with the information and data from step 312, the process 300 proceeds to step 314 where the optimal seatbelt height for comfort (SH$_1$) and the seatbelt height for restraint (SH$_2$) are both calculated. Specifically, the optimal height of the D-ring 86 for comfort of the identified occupant and the height of the D-ring 86 for restraint are calculated. With reference to FIGS. 5 and 7, illustrations of the adaptive seatbelt system 20 are shown. Similar to FIG. 5, in FIG. 7 the vertical heights of the retractor 64 and of the anchor plate 88 engaged in the buckle 90 are known from the physical dimensions of the vehicle 22. The horizontal distance 93 between the retractor 64 and the latch plate 88, and the horizontal distance 95 between the retractor 64 and the D-ring 86 are also similarly known. The height 81 of the seat bottom 36 is known from the seat height sensor 74 and the recline angle of the seat back 38 (shown in FIG. 2), is known from the seat angle sensor 62. The optimal comfort height 97 (SH$_1$), of the D-ring 86 is calculated using geometry so that the path of the belt 80 when extending between the D-ring 86 and the latch plate 88, crosses the occupant 103 at a comfortable height 101 as indicated in FIG. 5. The optimal restraint height 105 (SH$_2$), of the D-ring 86 is calculated, via the processor 52, using geometry so that the path of the belt 80 when extending between the D-ring 86 and the latch plate 88, crosses the occupant 103 as shown in FIG. 7 at a restrain height 107 (e.g. to move the belt 80 higher and closer to the occupant's neck as it crosses the occupant 80). The restrain height 107 is higher than the comfortable height 101 to increase restraint of the occupant 103. The process 300 proceeds to step 316 and the comfort control module provides the signal 118 to activate the restraint module 106.

At step 316 the restraint module 106 accesses information via the inputs 110 related to potential impacts of the vehicle 22 with other objects. For example, the exterior sensor suite 46 provides information from the exterior environment on any objects in the path of the vehicle 22, and on the movement of those objects. The process 300 proceeds to step 318 where the restraint module 106, via the processor 52, evaluates the risk level of an impact. When the risk level is below a threshold, meaning there is no or a low risk, the process 300 proceeds to step 320 where the restraint module 106 provides the signal 119 to the comfort control module 104, which provides output 116 in response, to adjust the height of the D-ring to the optimal comfort height SH$_1$ achieving the optimal comfort height 97/comfortable height 101, and the process 300 returns to step 316. The process 300 through the restraint module 106 processes a monitoring loop that cycles through steps 304-320 in preparation for responding to an increase in impact risk.

When the determination at step 318 is positive, meaning the risk of impact for the vehicle 22 exceeds the threshold, the process 300 proceeds to step 322 where the restraint module 106 provides the output signal 122 to adjust the height of the D-ring 86 to the optimal restraint height 105/SH$_2$ to obtain the optimal restraint height 105/retrain height 107, and the process 300 returns to step 316. The threshold may be selected based on the likelihood of an impact. The threshold may be selected at a low level because the outcome of repositioning the D-ring 86 is readily reversed. The process 300 through the restraint module 106 processes a monitoring loop that cycles through steps 304-322, and when the risk level subsides, the D-ring 86 is returned to the optimal comfort height SH$_1$. The process 300 through the restraint module 106 processes a monitoring loop that cycles through steps 304-320 in preparation for responding to an increase in impact risk.

Figure 8:
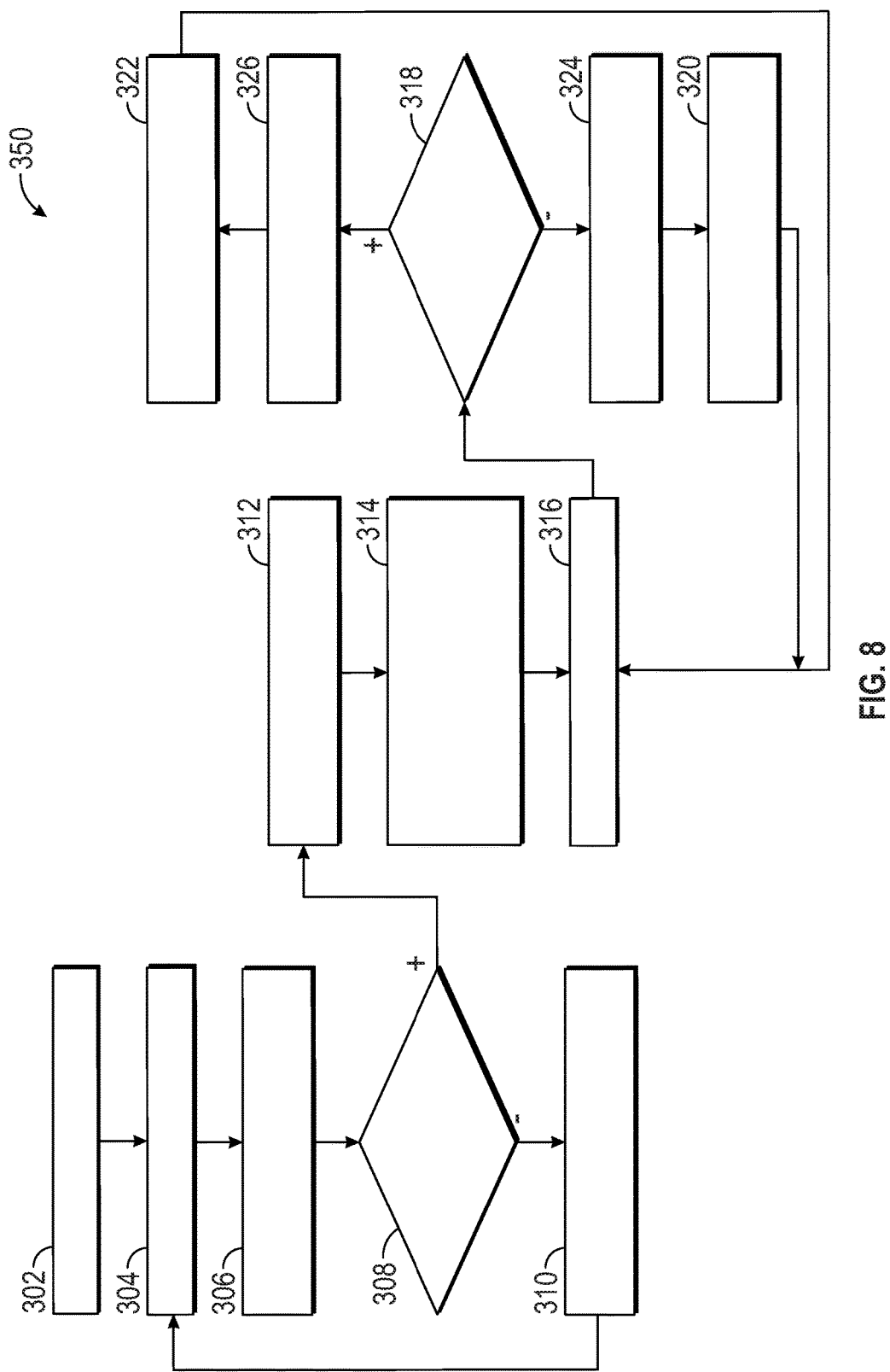
FIG. 8 is a flowchart of an adaptive seatbelt process in accordance with various embodiments.

With reference to FIG. 8, a variation of the process 300 indicated as process 350 includes steps 324 and 326. This embodiment provides for pre-tightening of the belt 80 and operates through steps 302-318 similar to the process 300. When the determination at step 318 is positive, meaning there is a risk of impact for the vehicle 22 that exceeds the threshold, the process 350 proceeds to step 326 where the restraint module 106 provides an output signal 124 to the retractor 64 to lock and more specifically, to the actuator 65 to lock the retractor 64. After locking the retractor 64, the process 300 proceeds to step 322 where the restraint module 106 provides the output 122 to adjust the height of the D-ring to the optimal restraint height 105/SH$_2$ to obtain the optimal restraint height 105/restrain height 107, and the process 300 returns to step 316. By locking the retractor 64 and then raising the D-ring to the optimal restraint height 105, the belt 80 is pre-tightened against the occupant in anticipation of an impact. The process 300 through the restraint module 106 processes a monitoring loop that cycles through steps 304-322, and when the risk level subsides below the threshold, the process proceeds to step 324 and the restraint module 106 provides the output signal 126 to the retractor 64 to unlock. The restraint module 106 also provides the signal 119 to the comfort control module 104, which provides the output signal 116 to the actuator 94, and the D-ring 86 is returned to the optimal comfort height SH$_1$. The process 300, through the restraint module 106, processes a monitoring loop that cycles through steps 304-320 in preparation for responding to an increase in impact risk.

Figure 9:
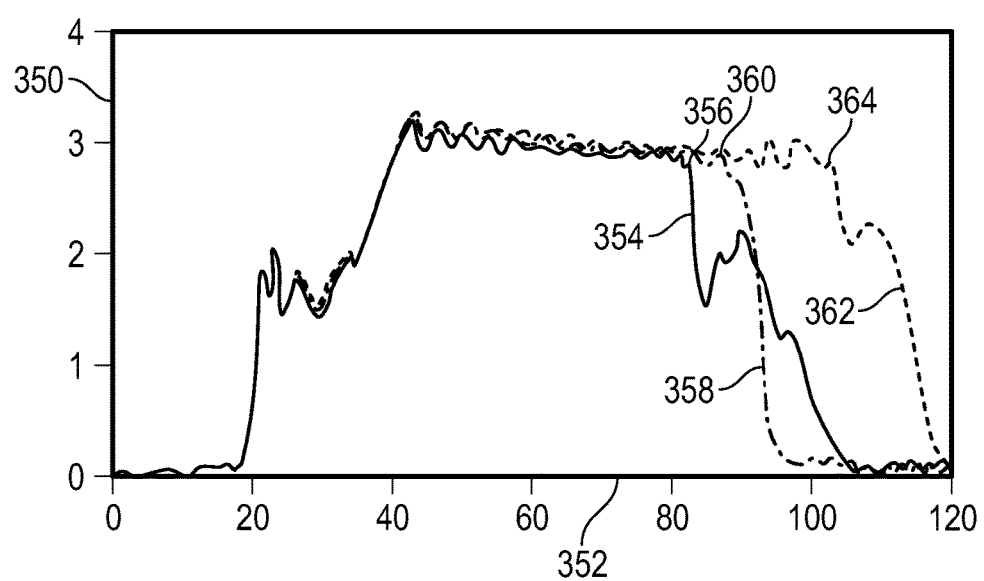
FIG. 9 is a graph of force versus time for various seatbelt examples.

With reference to FIG. 9 a graph is shown of force in kilo-Newtons on the vertical axis 350 versus time in milliseconds on the horizontal axis 352. Curve 354 shows the occupant force on the belt 80 in response to an oblique impact on the vehicle 22 for a system without adaptive seatbelt height adjustment. This example assumes the D-ring 86 remains at its lowest height setting. On curve 354, the reduction in force following point 356 corresponds to a reduction in restraining force between the occupant and the belt 80. Curve 358 shows the occupant force on the belt 80 in response to an oblique impact on the vehicle 22 for the adaptive seatbelt system 20, set at the optimal comfort height 97/SH$_1$. As can be seen, for curve 358, the point 360 where there is a marked reduction in force occurs at a later time than for the curve 356. Curve 362 shows the occupant force on the belt 80 in response to an oblique impact on the vehicle 22 for the adaptive seatbelt system 20 set at the optimal restraint height 105/SH$_2$. As can be seen, for the curve 362, the point 364 where there is a marked reduction in force occurs at a later time than for the curve 356. As a result, the adaptive seatbelt system 20 provides a restraining force for an increased amount of time for the optimal heights 97/SH$_1$, 105/SH$_2$.

While examples have been presented in the foregoing detailed description, it should be appreciated that a vast number of variations exist. It should also be appreciated that details are only examples, and are not intended to limit the disclosure's scope, applicability, or configurations, in any way. Rather, the foregoing detailed description will provide those skilled in the art with a convenient road map for implementing examples of the invention. It being understood that various changes may be made in the function and arrangement of elements described in examples without departing from the scope as set forth in the appended claims.

What is claimed is:

1. An adaptive seatbelt system for a vehicle comprising:
   a seat with a seat bottom and a seat back;
   a belt configured to restrain an occupant in the seat;
   first and second anchor points along the belt;
   a third anchor point along the belt at an elevated position relative to the first and second anchor points;

an actuator configured to raise and lower the third anchor point relative to the seat;
a controller having a processor and a data storage device that stores occupant identification data and biometric data corresponding to the occupant identification data, the controller receiving an input signal containing occupant identifying information;
the processor configured to receive the occupant identifying information and to compare it to the occupant identification data to verify occupant identity;
the processor, configured to determine an optimal comfort height for the third anchor point based on the biometric data; and
the actuator configured to adjust the third anchor point to the optimal comfort height in response to a signal from the processor;
wherein the processor is configured to determine an optimal restraint height for the third anchor point based on the biometric data from the data storage device, and wherein the optimal restraint height is different than the optimal comfort height;
wherein the actuator and the processor are configured to adjust the third anchor point to the optimal restraint height based on the biometric data from the data storage device.

2. The adaptive seatbelt system of claim 1 wherein the processor is configured to calculate a path of the belt that crosses the occupant at a restrain height, wherein the restrain height is provided when the third anchor point is positioned at the optimal restraint height.

3. The adaptive seatbelt system of claim 1 comprising:
a height sensor configured to generate height data indicative of a height of the seat bottom;
an angle sensor configured to generate angle data indicative of an angle of the seat back; and
wherein the processor is configured to determine the optimal comfort height for the third anchor point based on the biometric data, the height data, and the angle data.

4. The adaptive seatbelt system of claim 3 wherein:
the processor is configured to determine an optimal restraint height for the third anchor point based on the biometric data, the height data and the angle data, and the optimal restraint height is higher than the optimal comfort height.

5. The adaptive seatbelt system of claim 4 comprising:
a retractor configured to take up slack in the belt;
wherein the processor is configured to receive impact risk data and to determine whether an impact risk exceeds a threshold based on the impact risk data; and
wherein the retractor is configured to lock when the impact risk exceeds the threshold, in response to a signal from the processor.

6. The adaptive seatbelt system of claim 1 wherein:
the processor is configured to receive impact risk data and to determine whether an impact risk exceeds a threshold based on the impact risk data; and
the actuator is configured to adjust the third anchor point alternately to the optimal comfort height or to an optimal restraint height that is higher than the optimal comfort height, in response to signals from the processor.

7. The adaptive seatbelt system of claim 6 comprising:
an exterior sensor configured to generate exterior data indicative of a potential impact;
a retractor taking up slack in the belt; and
the processor is configured to receive the exterior data and to determine the impact risk based thereon, wherein the processor is configured to provide a lock signal to lock the retractor based on the impact risk.

8. The adaptive seatbelt system of claim 1 comprising an interior sensor configured to generate a signal representative of the occupant identifying information.

9. A method of controlling an adaptive seatbelt system for a vehicle having a seat with a seat bottom and a seat back, a belt, and a seatbelt anchor point for the belt that has a height variable by an actuator, the method comprising:
obtaining, from a data storage device occupant identification data and biometric data corresponding to the occupant identification data;
receiving, by a processor, an input representing occupant identifying information;
comparing, by the processor, the occupant identifying information to the occupant identification data to verify occupant identity;
determining, by the processor, an optimal comfort height for the anchor point based on the biometric data;
adjusting the anchor point to the optimal comfort height in response to a signal from the processor to the actuator;
determining, by the processor, an optimal restraint height for the anchor point based on the biometric data from the data storage device, wherein the optimal restraint height is different than the optimal comfort height; and
adjusting, by the processor and the actuator, the anchor point to the optimal restraint height based on the biometric data from the data storage device.

10. The method of claim 9 comprising:
storing the occupant identification data in the data storage device wherein the occupant identification data contains information that is unique and personally identifiable of an occupant.

11. The method of claim 9 comprising:
calculating a path of the belt that crosses the occupant at a restrain height, wherein the restrain height is provided when the anchor point is positioned at the optimal restraint height.

12. The method of claim 9 comprising:
receiving, from a height sensor, height data indicative of a height of the seat bottom;
receiving, from an angle sensor, angle data indicative of an angle of the seat back; and
determining, by the processor, the optimal comfort height for the anchor point based on the biometric data, the height data, and the angle data.

13. The method of claim 12 comprising:
determining, by the processor, an optimal restraint height for the anchor point based on the biometric data, the height data and the angle data, wherein the optimal restraint height is higher than the optimal comfort height.

14. The method of claim 13 comprising:
receiving, by the processor, impact risk data indicative of an impact risk for the vehicle;
determining, by the processor, whether the impact risk exceeds a threshold based on the impact risk data; and
locking a retractor when the impact risk exceeds the threshold, in response to a signal from the processor.

15. The method of claim 9 comprising:
providing a retractor configured to take up slack in the belt;
receiving, by the processor, impact risk data indicative of an impact risk for the vehicle;

determining, by the processor, whether the impact risk exceeds a threshold based on the impact risk data; and adjusting, by the actuator, the anchor point alternately to the optimal comfort height or to the optimal restraint height in response to a signal from the processor.

16. The method of claim 15 comprising:

generating, by an exterior sensor, the impact risk data as exterior data on an exterior environment of the vehicle; and when the impact risk exceeds the threshold, providing, by the processor, a lock signal to lock the retractor.

17. The method of claim 9 comprising:

generating, by an interior sensor, a signal representative of the occupant identifying information.

18. The method of claim 9 comprising:

calculating, by the processor, the optimal comfort height so that a path of the belt crosses the occupant at a comfortable height and calculating, by the processor, the optimal restraint height so that the path of the belt crosses the occupant at a restrain height that is higher than the comfortable height to increase restraint of the occupant.

19. The method of claim 9 comprising:

determining, by the processor, an optimal restraint height for the anchor point based on the biometric data, wherein the optimal restraint height is higher than the optimal comfort height;

receiving, by the processor, impact risk data indicative of an impact risk for the vehicle;

determining, by the processor, whether the impact risk exceeds a threshold based on the impact risk data;

locking a retractor when the impact risk exceeds the threshold, in response to a signal from the processor; and adjusting, by the actuator in response to a signal from the processor, the anchor point from the optimal comfort height to the optimal restraint height, after locking the retractor.

20. An adaptive seatbelt system for a vehicle comprising:

a seat with a seat bottom configured to have a height that is adjustable, and a seat back disposed at an angle that is variable relative to the seat bottom;

a belt configured to restrain an occupant in the seat;

first and second anchor points along the belt securing the belt to the vehicle;

a third anchor point along the belt securing the belt to the vehicle, the third anchor point at an elevated position relative to the first and second anchor points;

an actuator configured to raise and lower the third anchor point relative to the occupant;

a height sensor configured to generate height data indicative of the height of the seat bottom;

an angle sensor configured to generate angle data indicative of the angle of the seat back;

a controller that has a processor and a data storage device storing occupant identification data and biometric data corresponding to the occupant identification data, the controller receiving an input signal containing occupant identifying information;

the processor configured to receive the occupant identifying information and to compare it to the occupant identification data to verify occupant identity;

the processor configured to receive the biometric data, the height data and the angle data and to determine an optimal comfort height for the third anchor point based on the biometric data, the height data and the angle data;

the processor configured to determine an optimal restraint height for the third anchor point based on the biometric data, the height data and the angle data, wherein the optimal restraint height is higher than the optimal comfort height;

the actuator and the processor configured to adjust the third anchor point to the optimal restraint height based on the biometric data from the data storage device; and the actuator configured to alternately adjust the third anchor point to the optimal restraint height or the optimal comfort height in response to signals from the processor.

* * * * *